UNITED STATES PATENT OFFICE.

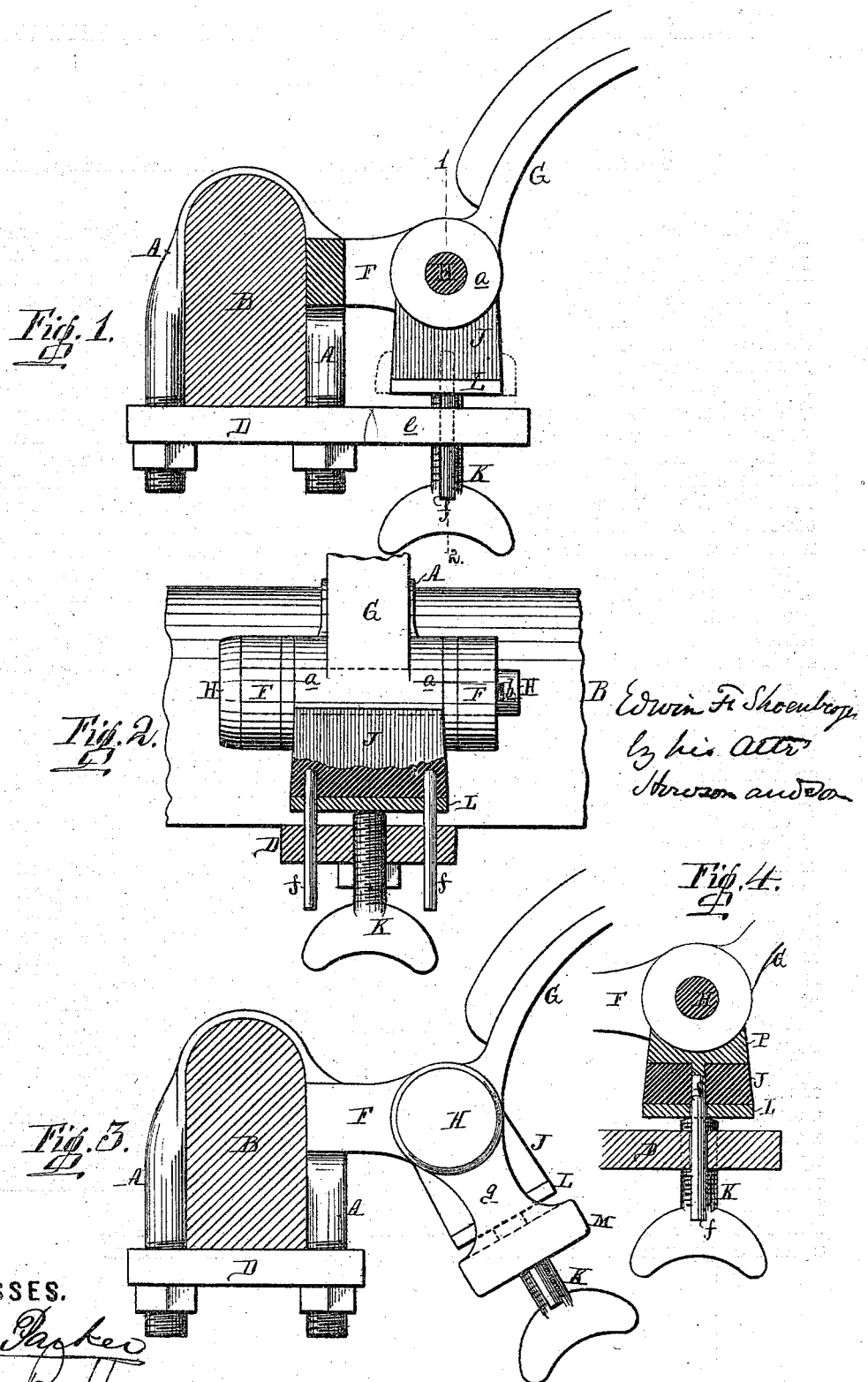

EDWIN F. SHOENBERGER, OF SHOEMAKERTOWN, PENNSYLVANIA.

IMPROVEMENT IN THILL-COUPLINGS.

Specification forming part of Letters Patent No. 122,669, dated January 9, 1872.

Specification describing an Improved Thill-Coupling invented by EDWIN F. SHOENBERGER, of Shoemakertown Post Office, Montgomery county, Pennsylvania.

My invention relates to an improvement in that class of thill-couplings in which rattling upon the coupling-bolt is prevented by a rubber spring or block caused to bear against the thill by a set-screw; and the improvement consists of a guided plate or plates combined with the rubber block and set-screw in the manner fully described hereafter, so as to prevent the displacement of the said rubber and enable the set-screw to be operated to the best advantage in compressing and retaining the same.

In the accompanying drawing, Figure 1 is a sectional view of a thill-coupling with my improvement; Fig. 2, a transverse section of the same on the line 1 2, Fig. 1; and Figs. 3 and 4, views of modifications.

A represents the clip fitting around the axle B and bolted as usual, at its lower ends, to a strap or plate, D, passing beneath the axle. Projecting outward from the front of the clip are two cheek pieces, F F, through which and through the cylindrical end $a$ of the thill-iron G passes the coupling-bolt H, the withdrawal of the latter being prevented as usual by a nut or key, $b$, at one end. For the purpose of preventing the rattling of the thill upon the coupling-pin, which invariably occurs after the parts have become somewhat worn, I force a block of rubber, J, against the said thill, and there retain it by means of a thumb-screw, K, which passes through an extension, $e$, of the strap D, and which bears against a plate, L, interposed between the said screw and the rubber.

I am aware that it is not new to force a block of rubber against a thill-coupling by means of a set-screw; but heretofore the screw alone, or a screw and a loose plate, have been depended upon as a means of retaining the rubber, so that the latter soon becomes forced from its place and lost, owing to the constant jolting and to the twisting motion of the thill-iron upon the upper surface of the same.

In my invention this objection is overcome, and at the same time the full advantage of the screw is retained, as a means of compressing the rubber, by providing the plate L, against which the force of the said screw is exerted, with guiding-rods $f f$, which pass through and slide freely in openings in the extended strap D, and thus hold the said plate in its proper position, and prevent the displacement of the same or of the rubber by either the screw or thill-iron. As an additional security I also secure the rubber to the guided plate either by extending the rods $f$ through the plate and into the rubber, as shown in Fig. 2, or by providing the said plate with flanges at its opposite sides, as indicated by dotted lines in Fig. 1; or both of these plans may be adopted in the same coupling.

It is not absolutely necessary in carrying out my invention that the set-screw and guide-pins $f$ should pass through an extension of the strap D, as the latter may, if desired, be made of the usual length, and a plate, M, secured to extensions $g g$ of the cheeks F be substituted for the same, as a means of guiding and supporting the rods and screws.

As a further modification of my invention, a saddle plate, P, Fig. 4, may be interposed between the rubber block and thill, the guiding-rods $f$ in this case being secured to the said saddle-plate and passing entirely through the rubber and plates L and D, so as to retain and guide the whole without interfering with their free sliding movement.

I claim as my invention—

The combination, in a thill-coupling, of an adjustable plate or plates, rubber block, set-screw K, and guide-rods $f$ or their equivalent, substantially as described.

In testimony whereof I have signed my name to this specification in the presence of two subscribing witnesses.

EDWIN F. SHOENBERGER.

Witnesses:
WM. A. STEEL,
HARRY SMITH.